No. 769,467.

Patented September 6, 1904.

UNITED STATES PATENT OFFICE.

FREDERICK W. BROWN, OF PORTLAND, COLORADO.

PROCESS OF MAKING HYDRAULIC CEMENT.

SPECIFICATION forming part of Letters Patent No. 769,467, dated September 6, 1904.

Application filed November 5, 1903. Serial No. 179,939. (No specimens.)

*To all whom it may concern:*

Be it known that I, FREDERICK W. BROWN, a citizen of the United States, residing at Portland, in the county of Fremont and State of Colorado, have invented certain new and useful Improvements in Processes of Making Hydraulic Cement, of which the following is a specification.

This invention relates to the process of making hydraulic cement from calcareous and argillaceous materials by heating in an oxidizing-furnace and then grinding, and has for its object to make available for use as cement furnace-slags, clays, shales, and gypsum deposits, also to economize in the production of the cement or plastering material of a high grade.

Cement has been made or attempted to be made from blast-furnace slag by grinding the slag and mixing it with lime or lime carbonates and then reburning to a vitrified mass and finally grinding, also by mixing furnace-slag in a fused state with carbonate of lime, but so far as I know without satisfactory results.

I have succeeded in producing a good quality of hydraulic cement by the addition to furnace-slag of sulfate of lime or gypsum and then heating in an oxidizing-furnace. The proportions of the slag and gypsum will vary to some extent, according to the variations in the said materials. There is not sufficient lime in ordinary slag to make a good cement. With a slag that contains approximately fifty per cent. of calcium oxid, thirty per cent. of silica, three per cent. of magnesia, thirteen per cent. of alumina, two per cent. of other oxids, and two per cent. of impurities to be expelled I would use one hundred parts, by weight, of slag to seventy-two parts, by weight, of calcium sulfate as found in any suitable form of gypsum. It will of course be necessary to know approximately the percentage of calcium sulfate the gypsum contains, and the impurities, excepting water, can be counted as so much clay or slag substance.

The slag may be drawn off from the furnace while in a molten condition and introduced into the converter or furnace, wherein it is exposed to heat and oxidation, and the gypsum is also introduced and mixed intimately with the slag, the whole being fused and after fusing subjected to a high degree of heat in an oxidizing-furnace and maintained in a liquid state to expel the sulfurous-acid gas as the materials are acted upon by the calcium sulfate, and a chemical action takes place whereby decomposition of calcium sulfate is effected, leaving oxid of lime in combination with the elements of the slag. The addition of the gypsum may be made at one time or by gradual additions from time to time. The temperature of the furnace may range from 2,600° to 3,200° Fahrenheit, and the heat is continued until the whole mass has been brought to the desired consistency and composition. The charge is then drawn in a liquid or viscous condition and preferably placed into a body of water for rapid cooling. The granulated or vitrified products are divided and ground in any ordinary manner of grinding cements.

In case ordinary furnace-slag is not at hand a slag may be readily produced from mixtures of argillaceous and calcareous materials properly heated and then treated as before specified for the furnace-slag. While I prefer to place the slag in the converter or furnace with the gypsum when in a molten state, it may be first allowed to cool or be taken when cool for placing in the oxidizing-furnace.

If desired, the slag-producing materials and the gypsum may be first heated together in a suitable furnace to bring to a fused state and then conducted to the oxidizing-furnace for treating, as before described; or the raw materials, including the gypsum, may be first reduced to a finely-powdered condition, then fused by heat or molded into bricks or pellets, which brick or pellets may be burned at a temperature of 2,800° to 3,200° Fahrenheit and afterward ground.

While other modes than those hereinbefore described may be employed to first bring the calcareous and argillaceous materials into association with the gypsum, after which they are heated and oxidized to produce hydraulic cement, it is believed that the foregoing is sufficiently full and clear to enable one skilled in the art to practice my process.

What I claim as my invention, and desire to secure by Letters Patent, is—

1. The process of making hydraulic cement consisting in subjecting argillaceous and calcareous materials with sulfate of calcium while together in a state of fusion, to a high degree of heat in an oxidizing-furnace, substantially as described.

2. The process of making hydraulic cement consisting in subjecting slag, such as results from melted argillaceous and calcareous materials, and sulfate of calcium while together in a state of fusion, to a high degree of heat in an oxidizing-furnace, substantially as described.

FREDERICK W. BROWN.

Witnesses:
LAMONT JOHNSON,
S. B. GORBUTT.